(12) United States Patent
Hayman et al.

(10) Patent No.: US 7,376,049 B2
(45) Date of Patent: May 20, 2008

(54) SEISMIC SENSOR WITH THERMAL STABILIZATION

(75) Inventors: Mark Jonathan Brice Hayman, Dunrobin (CA); Robin Brice Hayman, Dunrobin (CA); Geoffrey Stewart Bainbridge, Ottawa (CA)

(73) Assignee: Nanometrics Inc., Kanata, Ontario (CA)

( * ) Notice: Subject to any disclaimer, the term of this patent is extended or adjusted under 35 U.S.C. 154(b) by 161 days.

(21) Appl. No.: 11/337,834

(22) Filed: Jan. 23, 2006

(65) Prior Publication Data

US 2006/0201256 A1 Sep. 14, 2006

(30) Foreign Application Priority Data

Jan. 24, 2005 (CA) .................................. 2493830

(51) Int. Cl.
*G01V 1/16* (2006.01)
(52) U.S. Cl. ........................................ 367/178; 367/188
(58) Field of Classification Search ................ 367/178, 367/188; 73/649; 181/122, 401
See application file for complete search history.

(56) References Cited

U.S. PATENT DOCUMENTS

| | | | | |
|---|---|---|---|---|
| 3,662,327 | A | * | 5/1972 | White .......................... 367/181 |
| 4,519,252 | A | * | 5/1985 | McMahon .................... 367/140 |
| 6,363,035 | B1 | | 3/2002 | Canuteson et al. |

FOREIGN PATENT DOCUMENTS

| | | |
|---|---|---|
| JP | 3-138568 | 6/1991 |
| SU | 1509769 | 9/1989 |

OTHER PUBLICATIONS

MJ Usher, IW Buckner and RF Burch, *A miniature wideband horizontal-component feedback seismometer*, Journal of Physics E: Scientific Instruments, 1977, 8 pages, vol. 10, Great Britain.
L. Gary Holcomb, Charles R. Hunt, *An Evaluation of Installation Methods For STS-1 Seismometers*, United States Department of the Interior Geological Survey, Open File Report 92-302, 1992, 37 pages, Albuquerque, New Mexico.
Winifred Hanka, *Which Parameters influence the Very Long Period Performance of a Seismological Station?*, downloaded from http://www.gfz-potsdam.de/geofon/manual/welcome.html, on Feb. 19, 2004, GEOFON Network, 13 pages, Potsdam, Germany.

(Continued)

*Primary Examiner*—Ian J Lobo
(74) *Attorney, Agent, or Firm*—Straub & Pokotylo; Michael P. Straub

(57) ABSTRACT

A seismometer comprising a pressure sealed enclosure; an electrical component; an axis mechanics assembly having moving components, the axis mechanics assembly being in electrical communication with the electrical component; and a thermally insulating assembly mechanically supporting and surrounding the axis mechanics assembly for minimizing heat flow from the pressure sealed enclosure to the axis mechanics assembly and for enabling transmission of a seismic signal to the axis mechanics assembly, wherein the pressure sealed enclosure encloses the axis mechanics assembly, the thermally insulating assembly, and the electrical component.

28 Claims, 9 Drawing Sheets

OTHER PUBLICATIONS

RV Jones, JCS Richards, *The design and some applications of sensitive capacitance micrometers*, Journal of Physics E: Scientific Instruments, 1973, pp. 589-600, vol. 6, Great Britain.

Erhard Wielandt, *Seismic Sensors and their Calibration*, downloaded from http://www.geophys.uni-stuttgart.de/seismometry/man_html/man_html.html, 28 pages, on Mar. 15, 2000 Stuttgart, Germany.

E. Wielandt, G. Streckeisen, *The leaf-spring seismometer: design and performance*, Bulletin of the Seismological Society of America, Dec. 1982, vol. 72, No. 6, pp. 2349-2367, Eidgenossische Technische Hochshule, Institute fur Geophysik, Zurich, Switzerland.

U.K. Patent Search Report dated May 15, 2006 from Great Britain Patent Application GB0601348.6.

* cited by examiner

Boundary condition : constant surface temperature
Temperature at depths 1 mm, 10 mm, 20 mm, 30 mm, 40 mm Material: polypropylene co-polymer
Density = 910 kg/m³
Heat capacity = 2343 J/kg/K
Conductivity = 0.12552 W/m/K Boundary condition : constant surface temperature
Temperature at depths 1 mm, 10 mm, 20 mm, 30 mm, 40 mm Material : polystyrene foam
Density = 46 kg/m$^3$
Heat capacity = 1130 J/kg/K
Conductivity = 0.025 W/m/K

SEISMIC SENSOR WITH THERMAL STABILIZATION

CROSS-REFERENCE TO RELATED APPLICATIONS

This application claims priority to Canadian application no. 2,493,830 filed on Jan. 24, 2005, and is related to co-pending US applications: i) U.S. application Ser. No. 11/337,967, filed Jan. 23, 2006 and titled "MASS POSITIONING APPARATUS FOR A SEISMIC SENSOR" and ii) U.S. application Ser. No. 11/337,804, filed Jan. 23, 2006 and titled "MASS POSITIONING ADJUSTMENT MECHANISM FOR A SEISMIC SENSOR" all of which are hereby expressly incorporated by reference.

FIELD OF THE INVENTION

The present invention relates to the field of seismic sensors and more particularly to seismic sensors having thermal stabilization assemblies.

BACKGROUND

Temperature has a noticeable effect on the performance of high precision electromechanical instruments such as seismic sensors (also termed seismometers). For some instruments an active temperature control system involving heaters, coolers and insulation is employed to stabilize the temperature within the instrument. As the precision of the instrument increases, the climate control system must maintain the temperature over an ever narrower range. At some point it becomes impractical to use an active climate control system to maintain a stable operating temperature. Active climate control systems do not control temperature with sufficient stability to be of much practical use for seismic sensors.

Conventional approaches include placing the seismic sensor in a temperature stable environment such as an underground vault, with no active climate control system, and placing insulation around the entire seismic sensor. These approaches rely on the seismic sensor making use of ground temperature to maintain temperature stability.

Another more complex approach of maintaining temperature stability in seismic sensors includes placing the mechanical components of the sensor in an externally insulated and evacuated bell jar while keeping the main electrical component outside the bell jar. While this approach is more effective at maintaining temperature stability, it comes at a cost. It is expensive and complex to implement and maintain.

There is a need to provide thermal stabilization solutions that reduce both internal and external temperature disturbances in seismic sensors and that can be realized relatively economically inside the seismic sensor.

SUMMARY

In accordance with one aspect of the present invention there is provided a seismometer comprising: a pressure sealed enclosure; an electrical component; an axis mechanics assembly having moving components, the axis mechanics assembly being in electrical communication with the electrical component; and a thermally insulating assembly mechanically supporting and surrounding the axis mechanics assembly for minimizing heat flow from the pressure sealed enclosure to the axis mechanics assembly and for enabling transmission of a seismic signal to the axis mechanics assembly, wherein the pressure sealed enclosure encloses the axis mechanics assembly, the thermally insulating assembly, and the electrical component.

DETAILED DESCRIPTION

A characteristic of seismometers (the terms seismometer, broadband seismometer and seismic sensor will be used interchangeably) is that they do not need to maintain a specific internal absolute temperature such as 25 degrees C. A seismometer can acclimatize and adjust to the ambient temperature of the local environment. After acclimatization, the internal temperature of the seismometer should be stable to reduce thermal effects which can adversely affect performance of the seismometer. Further changes in temperature after acclimatization can be detected by existing seismometers. Typically, seismometers should maintain temperature stability on the order of $1\times10^{-6\circ}$ C. in the frequency band of interest to avoid measuring thermal noise. A typical frequency band of interest is 20 Hz to 24 hours. A seismometer can detect the diurnal (daily cycle) change in temperature. At longer periods, excessive temperature sensitivity limits the sensor's ability to detect the intended seismic signals. Temperature stability is one of a number of factors that determine the noise floor of a seismometer at longer periods—thereby minimizing/reducing temperature sensitivity.

Seismic sensors that require temperature sensitivity to be minimized are long period (typical bandwidth of 15-40 seconds) and broadband (a typical bandwidth of 0.1 to 100 seconds) seismometers. Long period seismometers are heavy and unwieldy, and have been largely eclipsed by modern broadband seismometers. Broadband seismometers have evolved from semi-permanent installations with external site installed pressure vessels to relatively small and portable instruments in which the seismometer is self-contained in its own pressure vessel.

Figure 1:
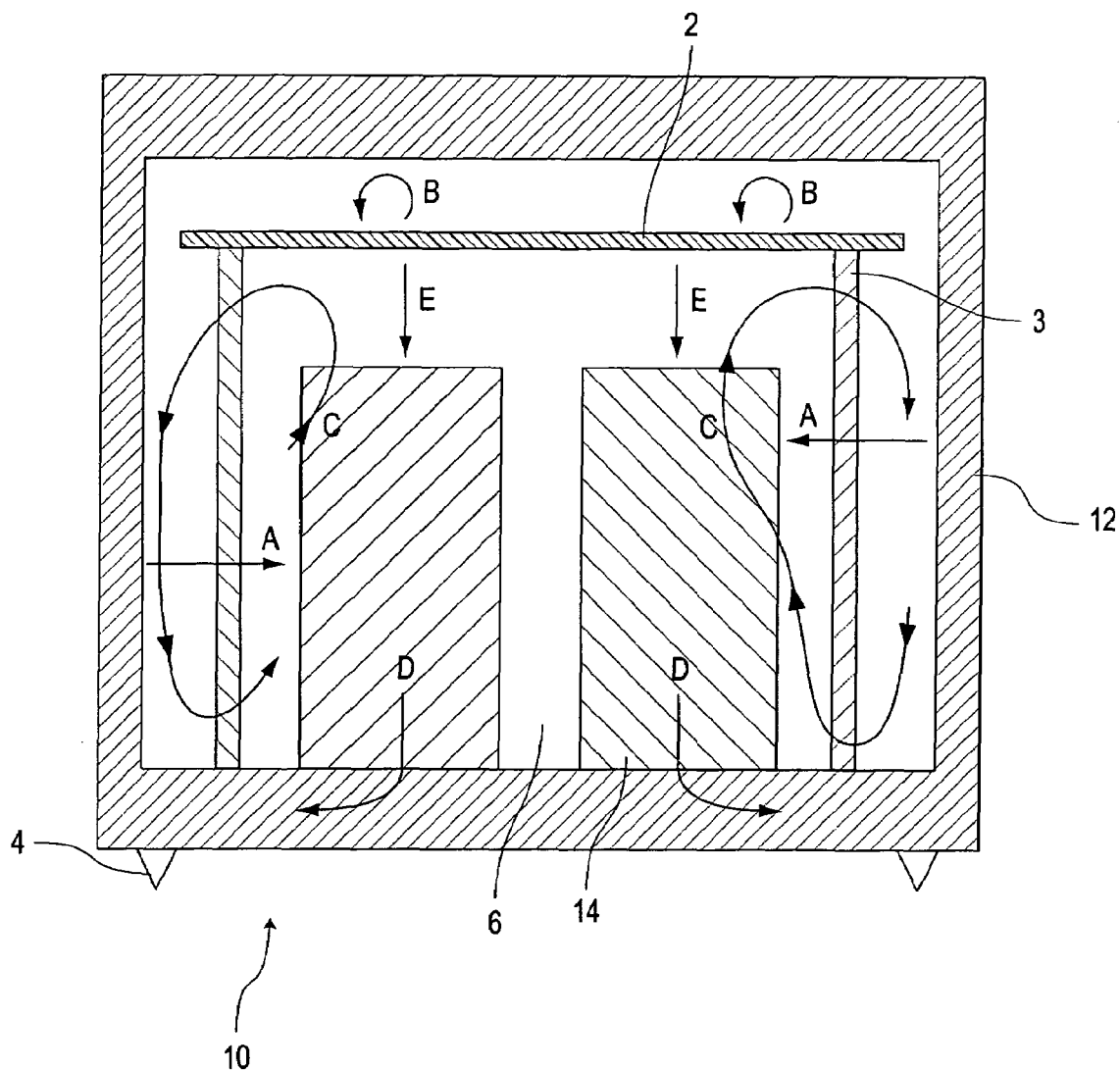
FIG. 1 illustrates a schematic block diagram of a typical seismometer illustrating heat flows.

It is recognized in the field that broadband seismometers are susceptible to ambient temperature variations. Attempts have been made to reduce temperature sensitivity by entombing seismometers in layers of brick or sand and insulation to allow a sensor to reduce temperature variations. Such measures may be viewed as being an external filter that attenuates the effect of temperature swings in the ambient. However, such measures do not address the effects of internally generated heat that causes temperature variation of the sensitive sensor mechanics. FIG. 1 is a block diagram representation of a typical seismometer 10 to illustrate heat generation and flow. The seismometer 10 includes a pressure sealed enclosure 12 supported by a plurality of enclosure feet 4. The free space in the enclosure is filled with air 6. A main electronics component arranged as printed circuit board (PCB) 2 is supported by standoffs 3, which are attached to the enclosure 12. At least one axis mechanics module 14 is mounted to the enclosure 12 within the standoffs 3. The term axis mechanics is used to refer to one or various combinations of the following: frame, boom, suspension, spring, force actuator, displacement transducer, axis electronics and optional re-centering mechanism as illustrated and described in detail in conjunction with the drawings (see for example FIG. 8). There are typically three axis mechanics in a three component seismometer, and one axis mechanics in a single component seismometer.

The axis mechanics are a temperature sensitive component in a seismometer. The effects of temperature on the axis mechanics include dimensional changes to the axis mechanics, and temperature induced convection disturbing the components of the axis mechanics. FIG. 1 illustrates examples of how heat flows to and from the axis mechanics thus changing the temperature of the axis mechanics. Heat flow arrows (A) illustrate radiant heat flow from the enclosure 12 to the axis mechanics 14. Heat flow arrows (B) illustrate convection cell heat flow from the main electronics 2 to the enclosure 12. Heat flow arrows (C) illustrate convection cell heat flow from the main electronics 2 to the enclosure 12 to the axis mechanics 14. Heat flow arrows (D) illustrate conduction heat flow from the enclosure 12 to the axis mechanics 14. Heat flow arrows (E) illustrate radiant and conduction heat flow from the main electronics 2 to the axis mechanics 14. Further, there is conductive heat flow that causes a temperature gradient across the axis mechanics resulting in different components of the axis mechanics being at different temperatures. The convection air currents inside the seismometers can mechanically disturb the moving parts of the axis mechanics and transfer heat to the axis mechanics, changing the temperature, both of which result in noise that is detected by the seismometer.

Figure 2:
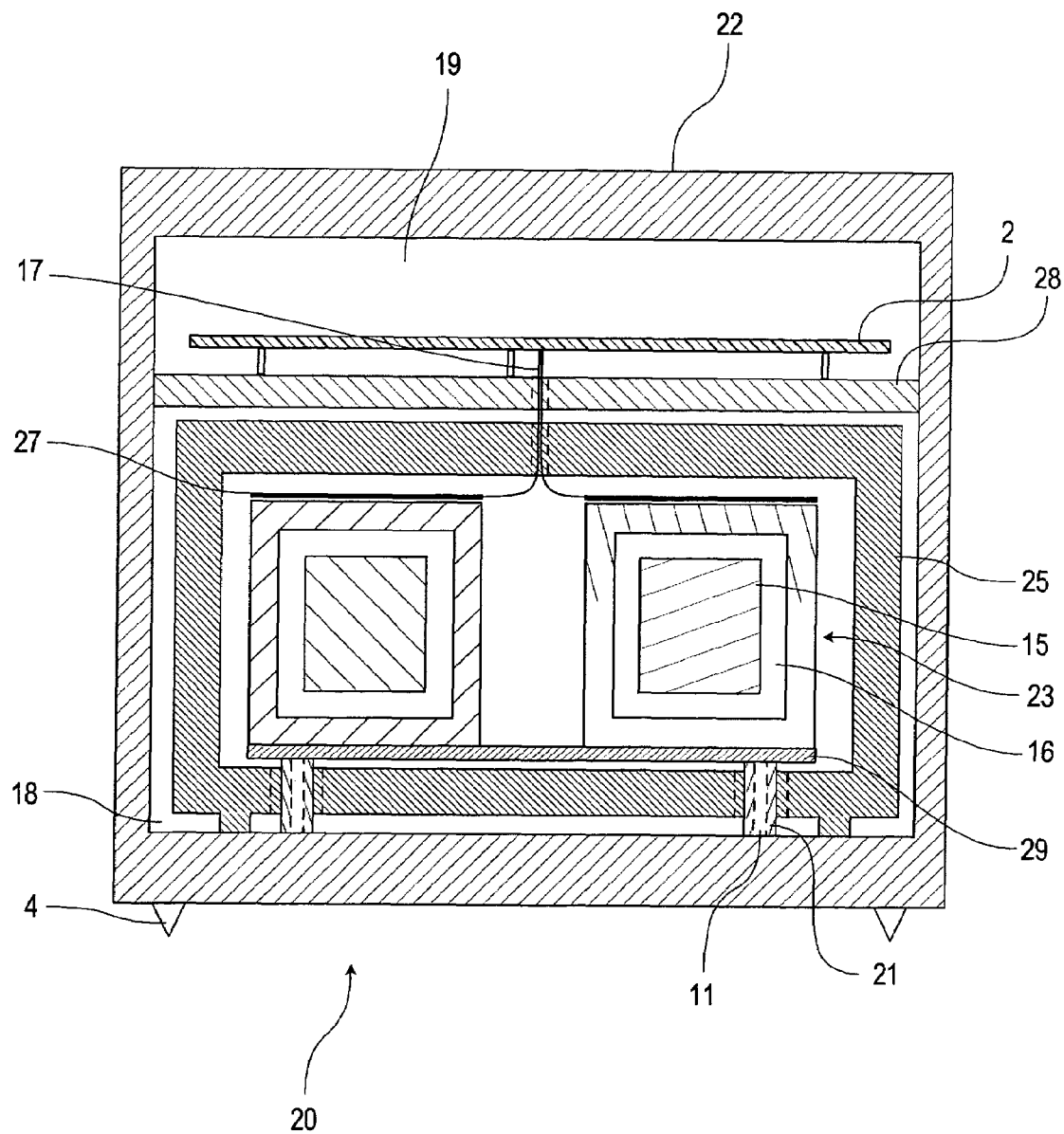
FIG. 2 illustrates a schematic block diagram of a seismic sensor that incorporates thermal stabilization assemblies according to various embodiments of the present invention.

FIG. 2 illustrates a block diagram of a seismic sensor 20 that incorporates multiple temperature stabilization assemblies according to embodiments of the present invention. The seismic sensor 20 includes a pressure sealed enclosure 22 with a plurality of leveling feet 4. A main electronics component 2 (such as a printed circuit board (PCB)) is supported by a tray 28, which is located near the top of the enclosure 22. The tray 28 also acts to separate the interior of the enclosure 22 into two chambers: an electronics chamber 19 and a mechanics chamber 18.

The tray 28 carries heat from the main electronics component 2 to a surface of the enclosure 22 and limits the exchange of air between the electronics chamber 19 and the mechanics chamber 18. The tray 28 also reflects radiant heat back to the electronics component 2. The mechanics chamber 18 includes axis mechanics modules 23 mounted to a base plate 29. The base plate 29 is supported by spacers 21. The axis mechanics modules 23 are, collectively, enclosed by an insulating module 25. At least one of the axis mechanics modules 23 includes axis electronics 27. The axis mechanics modules 23 have within them moving components 15 and are separated from the other axis mechanics components by an air space 16. The axis electronics 27 are in electrical communication 17 with the main electronics 2. The spacers 21 separate the base plate 29 from the enclosure 22 to provide a lower conduction of heat from the enclosure 22 to the axes mechanics modules 23. In addition, the spacers 21 provide room between the base plate 29 and the enclosure 22 for portions of the insulating module 25. The base plate 29 is pseudo-kinematically connected to the enclosure 22 via the spacers 21. The spacers 21 can be rigid to assist in seismic motion being accurately transferred to the base plate 29, and be made of material that has a low thermal conductivity (e.g., ceramic, glass-epoxy and glass filled plastic). The spacers 21 and base plate 29 are attached to the enclosure 22 using bolts 11 mounted through the center (results in less distortion to the base plate 29) of the spacers 21.

In one example, the spacers 21 are hollow cylinders with an inner and outer radius. The clamping force of the bolts is symmetrically distributed about the spacers 21, while minimizing the bending torque applied to the base plate 29. The bolts can be made of a thermally insulating material such as glass-epoxy or a ceramic composite material. A selection of these types of bolts helps to minimize the flow of heat through the bolts, and prevents the bolts from thermally short circuiting the insulating module 25.

Figure 3:
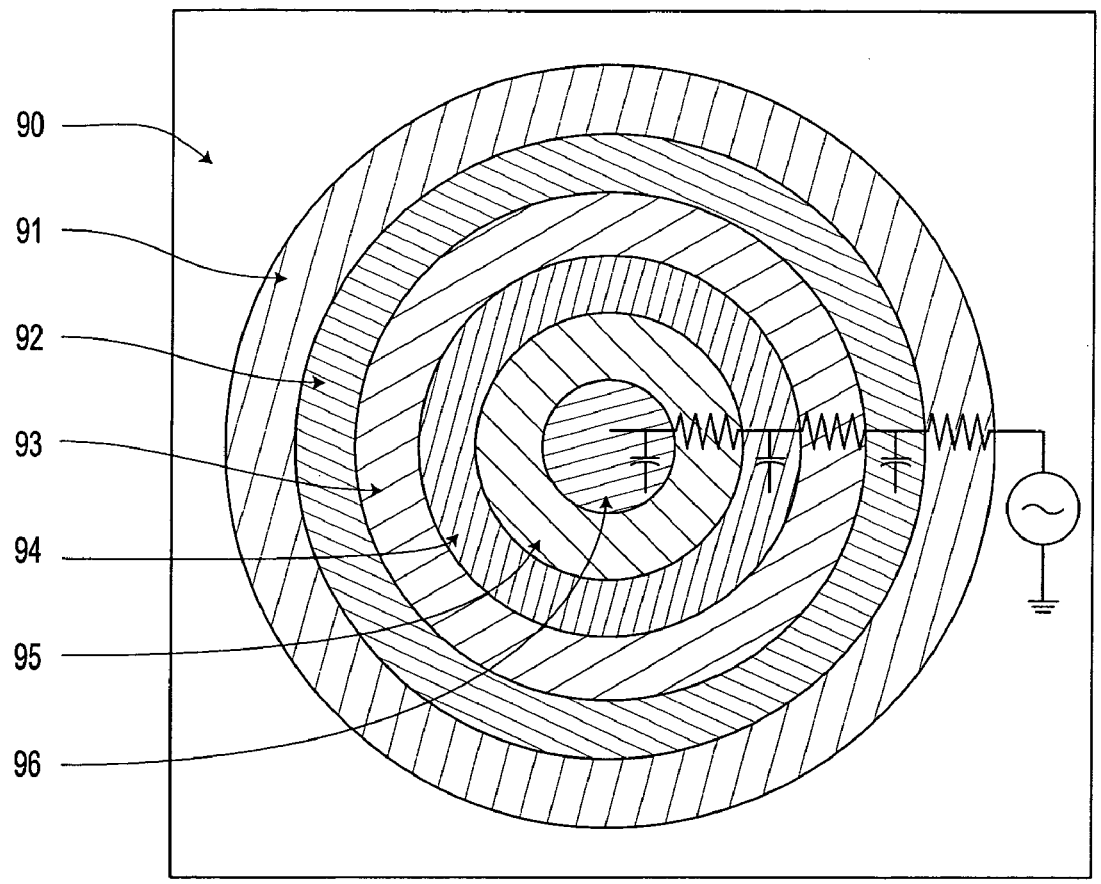
FIG. 3 illustrates a thermal model of a seismic sensor.

FIG. 3 illustrates a representative thermal model of the seismometer 20 in FIG. 2. The thermal model consists of a plurality of shells 90, 91, 92, 93, 94, 95, 96 representing different components of the seismometer, its surroundings and various seismometer thermal stabilization assemblies. There are two classes of shells: thermally conductive mass shells and thermal insulating volume shells. The thermally conductive mass shells are represented in an embodiment as shells 92, 94, 96. The thermally conductive mass shells have a high thermal mass and high thermal conductivity. The thermal insulating volume shells are represented in an embodiment as shells 91, 93, 95. In the model, each shell is continuous and is thermally isolated from the next shell but one.

Thermally isolated means that the heat flow has been minimized and no thermal short circuits are present. For example, shell 92 is isolated from shell 94 by shell 93. The thermal insulating volume shells have a low thermal conductivity and may have a low or high thermal mass. The outer shell 90 represents the ambient temperature (shown as a voltage source). The next shell 91 represents external insulation wrapped around the seismometer and is shown as a resistance (thermal resistance). The external insulation can be as simple as still air. The shell 92 represents the pressure sealed enclosure 22 of the sensor 20 and is shown as a thermal capacitance. It is a high thermal mass with a high conductivity such as metals (e.g., aluminum). The next shell 93 represents the insulating material 25 of the sensor 20 and is shown as a thermal resistance. The shell 94 represents the axis frame 52, the baseplate 29, and covers 60 and 62 of the sensor 20 and is shown as a thermal capacitance. In an embodiment the frame, baseplate and covers have a high thermal mass and a high thermal conductivity (e.g., aluminum). The shell 95 represents an air gap and a reflective surface between the axis frame 52, baseplate 29, covers 60 and 62, and the moving components of the axis mechanics (including the boom 54, displacement transducer 53, spring 56) and is shown as a thermal resistance. The reflective surface reflects incident radiation from the other side of the air gap and acts as a radiation shield. Lastly, the inner circle 96 represents the moving components of the axis mechanics and is shown as a thermal capacitance.

FIG. 3 illustrates that the various thermal stabilization assemblies of the present invention can be viewed as a systematic arrangement of cascaded thermal filters to attenuate temperature effects inside the sensor enclosure. Sensitive mechanics are placed in the inner most thermal mass shell. The shells 93, 94, 95 isolate the moving components of the axis from the sensor electronics 2. Microscopic temperature variations of the axis mechanics caused by internal heat generated by the electronics and caused by external ambient temperature variations can be reduced to imperceptible levels.

Each insulating volume shell minimizes heat flow by reducing thermal convection, thermal conduction, and thermal radiation. Thermal conduction is minimized by using a material with a high thermal resistance, or with a low thermal diffusivity. Thermal convection is minimized by using a solid material rather than a gas. When a gas is used, it is confined to a narrow gap to minimize convection. A gas is beneficial because it has a low thermal conductivity and provides mechanical isolation between the shells. Thermal radiation is minimized by using low emissivity coatings (e.g., gold, nickel, aluminum, germanium, rhodium, and silver) or polished surfaces on the materials on either side of an air gap. For the purposes of the model in FIG. 3, the polished surface or low emissivity coating are considered to be part of the insulating volume shell because they minimize radiant heat flow.

Each thermal mass shell maximizes heat flow and thermal mass, and minimizes air flow through the thermal mass. High conductivity is beneficial because it evenly distributes the heat around the shell resulting in an isothermal shell. A high conductivity shell also distributes point heat sources evenly over the shell. A thermally massive isothermal shell minimizes temperature gradients across the shell. By minimizing temperature gradients, the convective heat flow in the inner shells is minimized.

Figure 4:
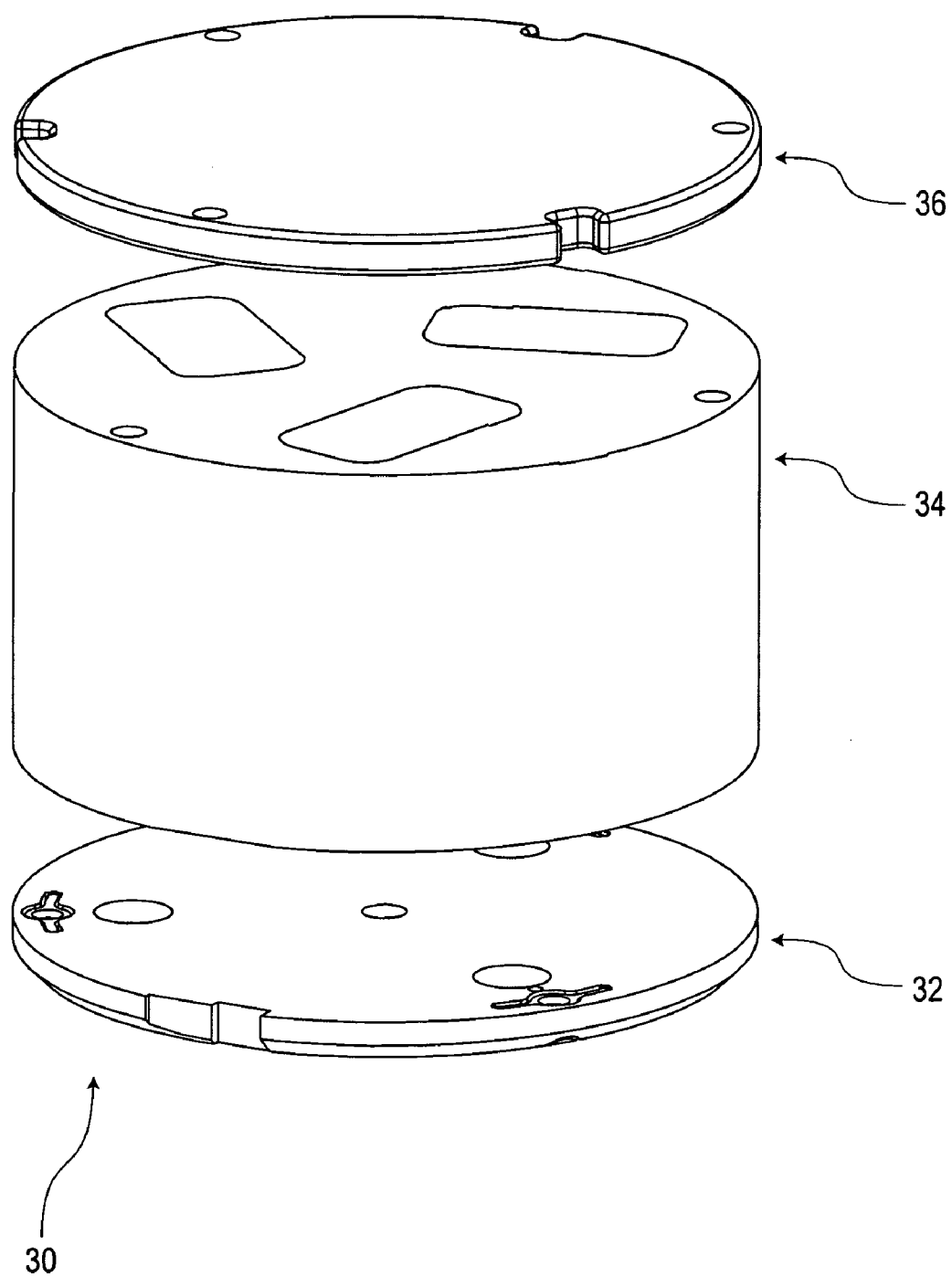
FIG. 4 illustrates an exploded perspective view of various insulating portions of a thermal stabilization assembly according to an embodiment of the present invention.

FIG. 4 illustrates an exploded perspective view of various insulating portions of a thermal stabilization assembly 30 according to an embodiment of the present invention. The shapes of the components of the thermal stabilization assembly are selected for maximum insulating value and to minimize the air volume in the mechanics chamber 18 of the sensor 20. Air volume is minimized by displacing air with a solid material that has either a low conductivity (an insulator) or a lower thermal diffusivity. By minimizing the air volume inside the sensor 20, convection is minimized. Convection inside the sensor 20 can mechanically disturb the moving parts of the axis mechanics modules 23 and transfer heat to the axis mechanics modules 23 changing the temperature, both of which result in noise that is detected by the sensor 20.

The thermally insulating assembly 30 includes three components of insulation: an insulation base 32, an insulation body 34, and an insulation top 36. The three insulating components 32, 34, 36 can be made of the same insulating material to minimize differential thermal expansion. The base 32 is installed first, followed by the installation of the spacers 21, base plate 29 and axes mechanics modules 23 (see FIG. 2). Next, the insulating body 34 slides down over the axes mechanics modules 23 and is fastened to the insulating base 32. Lastly the insulation top 36 is attached to the insulating body 34. The insulation base 32 is in contact with the enclosure 22.

Figure 5:
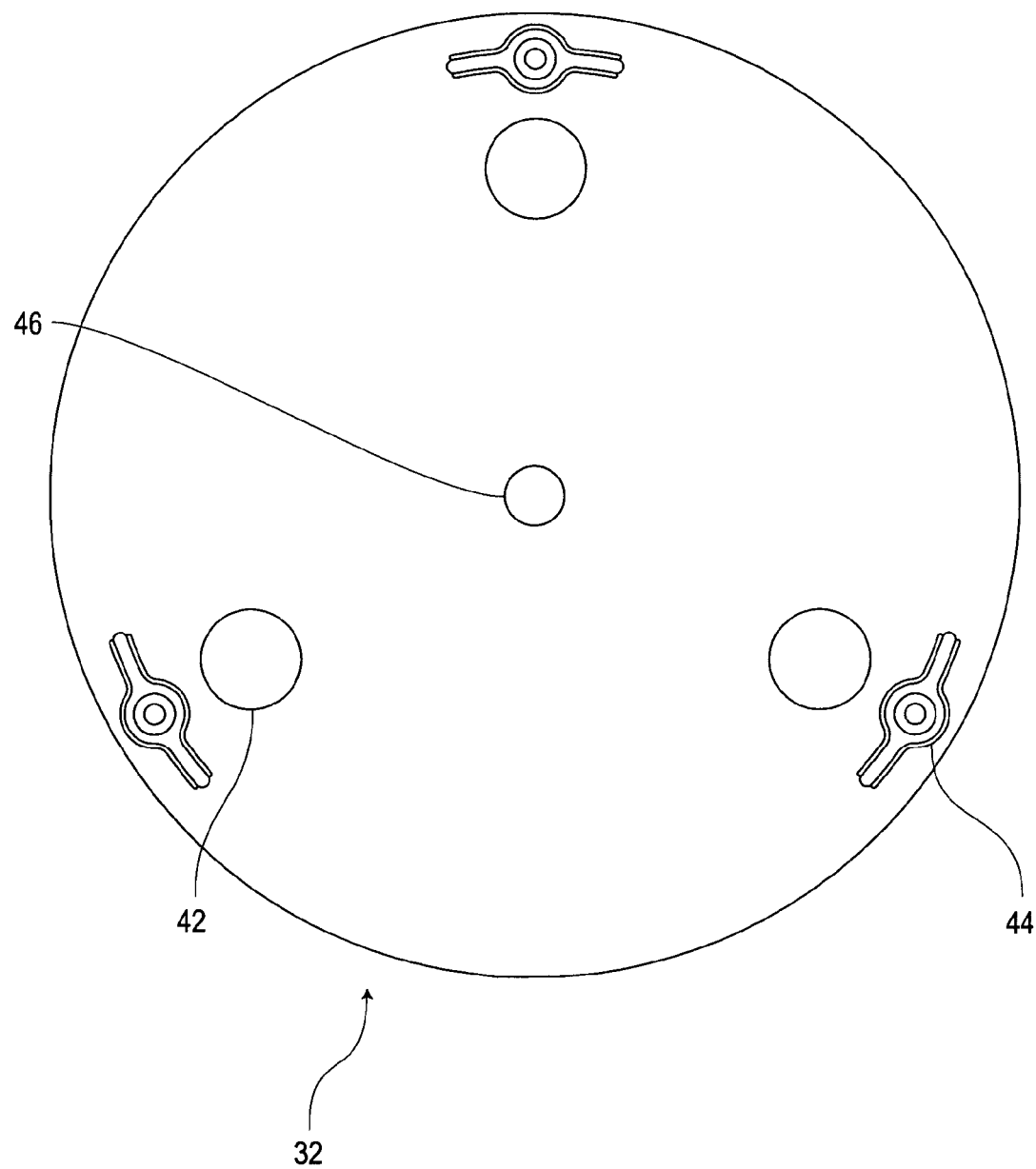
FIG. 5 illustrates a top view of the insulating base shown in FIG. 3.

FIG. 5 illustrates a top view of the insulating base 32 shown in FIG. 4. The thickness of the insulation base 32 is dictated by the degree of insulation required and the performance of the insulating material. The insulating base 32 includes the following features: three insulating spacer holes 42, three flexural mounting points 44, and a center mounting point 46. By including these features into the insulating base 32, the number of different materials is minimized, which reduces the differential thermal expansion and minimizes micromechanical movement. The insulating base 32 is mounted pseudo-kinematically to the enclosure 22 to allow for the differential thermal expansion of the insulating module 25 and the enclosure 22.

The thermal expansion coefficient of an exemplary insulating material is about 100 ppm/degree C., and the thermal expansion coefficient of an exemplary material for the enclosure is about 75 ppm/degree C. The 25 ppm differential expansion is mitigated by the flexure points. The three mounting points 44, which have two flexure points each, at the outer radius (spaced by 120 degrees) of the base 32 allows the base 32 to expand or contract with temperature without building stresses at the mounting points 44, which can result in micromechanical movement. The center mounting point 46 provides rigidity to the insulating base 32 relative to the enclosure 22. The insulating spacer holes 42 are sized slightly larger than the spacers 21 so that there is no contact between the spacers 21 and the insulation base 32 over the entire temperature range of the sensor 20. The clearance is also minimized to restrict the convective flow of air into the mechanics chamber 18. The gap between the spacers 21 and the insulating base 32 may be filled with a compressible insulating material to further restrict convection.

The insulating body 34 is formed on the inside to minimize the clearance between the axes mechanics modules 23 and the insulation module 25. This minimizes the thermal convection of air around the axes mechanics modules 23 further minimizing the flow of heat between the insulation module 25 and the axes mechanics modules 23. The outer surface of the insulating body 34 is formed to minimize the clearance between the insulation module 25 and the enclosure 22. Again, this minimizes the thermal convection of the air between the enclosure 22 and the insulation module 25. When convection is minimized, air acts as an effective insulator. The thickness of the insulating body 34 (the mean distance between the inner and outer surfaces) is dictated by the degree of thermal insulating required and the performance of the insulating material.

The insulating top 36 is a component to provide a mechanism of routing wires for connecting the main electronics 2 to the axis electronics 27. The thickness of the insulation top is dictated by the degree of insulation required and the performance of the insulating material. There is a gap between the insulating top 36 and the tray 28 to mechanically decouple the insulating top 36 from the tray 28. The gap between the insulating top 36 and the tray 28 is minimized to reduce convective heat transfer. Again, with the gap minimized, the air acts as an effective insulator. The thermally insulating assembly 30 which includes the insulating base 32, the insulating body 34, and the insulating top 36 form the insulating module 25 of the seismic sensor 20.

A suitable insulating material (e.g., ethyl vinyl acetate, poly vinyl butyral, butyl rubber, molded urea-formaldehyde, poly vinylidene fluoride, poly vinylidene chloride, modified polystyrene, polypropylene copolymer, polyvinyl chloride, allyl resins, polypropylene and polyethylene) for the insulating module 25 is used to assist in the reduction of heat flow (see A, B, C, D and E in FIG. 1) through the components of a seismic sensor.

As is commonly understood, insulation restricts the flow of heat from a higher temperature, through the insulating materials, to a lower temperature. As soon as a temperature difference exists across an insulating material, thermal energy begins to flow. By slowing the rate of heat transfer, insulation reduces or attenuates the rate of change of temperature. However, because heat begins to flow nearly instantaneously, a change in either the inside or the outside temperature is quickly reflected in a change in the rate of heat flow and thus a small but finite change in the inside temperature. To help slow this change in the inside temperature another physical property of material is considered: thermal diffusivity. Thermal diffusivity is the measure of how fast heat travels through a given material, and is a function of the conductivity divided by the product of the density and specific heat (units: area/time) of the given material. The time lag between outside and inside peak temperatures is a function of the thickness of the material divided by the square root of the diffusivity. A low thermal diffusivity material both lowers the net heat flow and slows the change in the inside temperature by absorbing heat into the material which makes it effective in attenuating temperature fluctuations.

Another way of understanding thermal diffusivity is by analogy with electrical filters. There are two classes of filters: lumped filters and distributed filters. The latter may be considered a special case of lumped filters in which the lumped elements are infinitesimally small. For a certain range of filter parameter values a filter can be characterized with a diffusion model and having properties such as skin depth and diffusion velocity. A filter that is modeled by diffusion has a much higher roll off of attenuation vs. frequency. Embodiments of the present invention use this property of thermally diffusive filters to increase the attenuation of unwanted temperature variations for a given thickness. In particular, according to embodiments of the present invention the materials used in the insulation module 25 (see FIG. 2) are based on their properties as thermal diffusion filters.

A low thermal diffusivity material has a low conductivity (high R value) and a high heat capacity thus combining the properties of a thermal insulator with a high thermal mass material. Suitable insulating materials can have, for example, a thermal diffusivity less than $1.5 \times 10{-7}$ m$^2$/sec and a thermal conductivity of less than 250 mW/m/K. One class of materials that has low thermal diffusivity is certain polymers.

Figure 6:
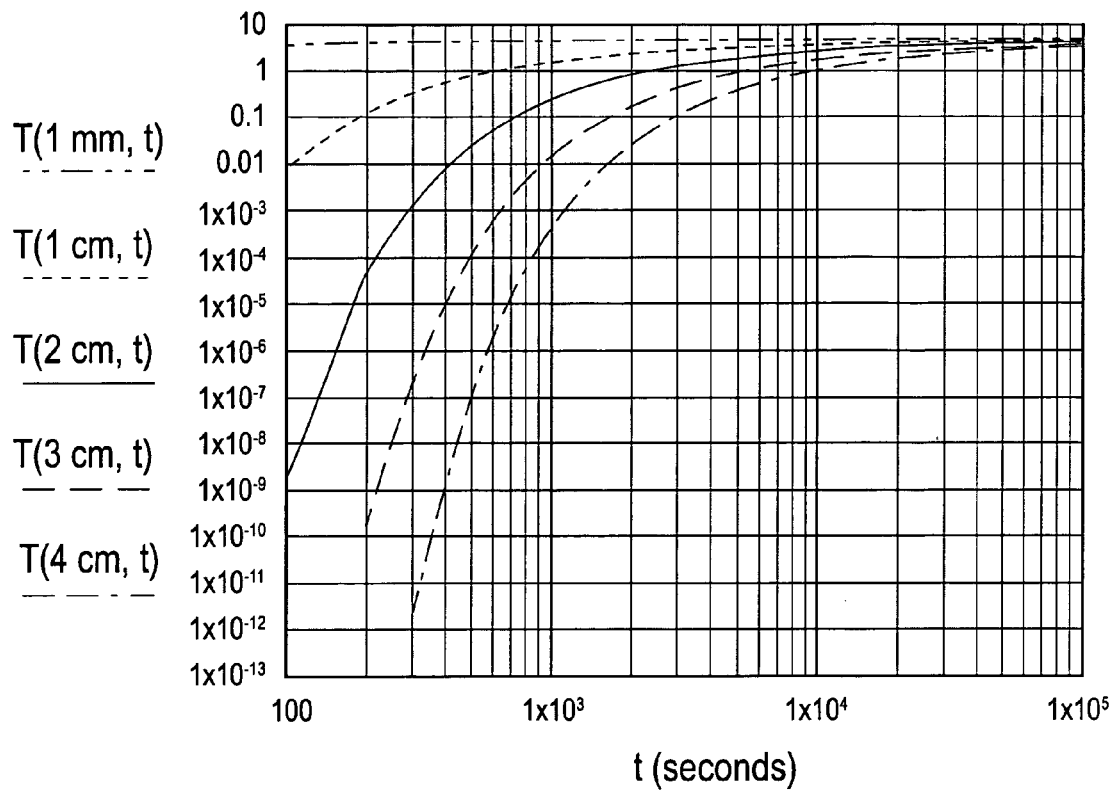
FIG. 6 illustrates a graph of temperature vs. time for a first semi-infinite solid.
Figure 7:
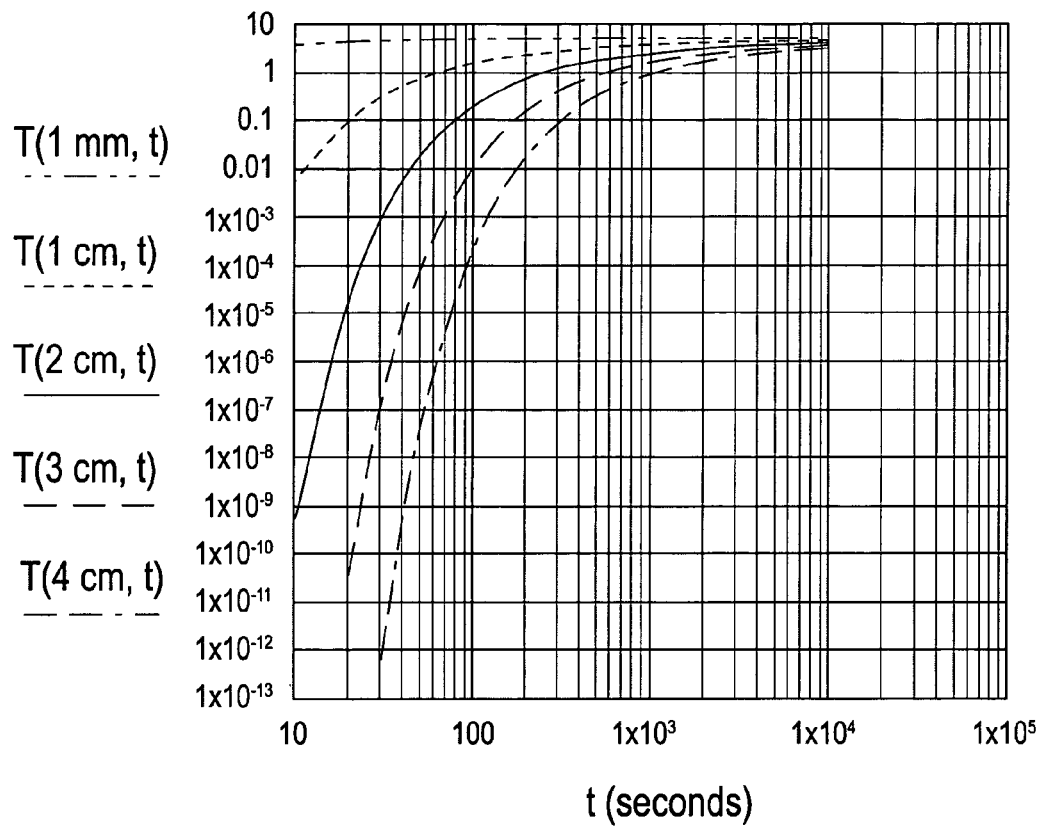
FIG. 7 illustrates a graph of temperature vs. time for a second semi-infinite solid.

FIGS. 6 and 7 compare and contrast the difference in performance of a low thermal diffusivity material and a low thermal conductivity material. The graphs show the temperature profile of a semi-infinite solid, where the top surface of the solid has a step change in temperature of 5° C. at time=0 and is then held at a constant temperature for all time. The different curves on the graph show the temperature over time at various depths of the material. FIG. 6 illustrates the performance of a low diffusivity material (polypropylene co-polymer) and FIG. 7 illustrates the performance of a low conductivity material (polystyrene foam). Note that polystyrene foam has conductivity similar to air. Comparing the graphs at a 2 cm depth and at a temperature rise of $1 \times 10^{-6 \circ}$ C., the polystyrene heats up in about 18 seconds and the polypropylene co-polymer takes about 150 seconds. The longer period of time required to heat the polypropylene illustrates the benefit of using a low diffusivity material over an insulating material. The temperature rise of $1 \times 10^{-6 \circ}$ C. was chosen because this is the order of magnitude where a seismic sensor can measure the temperature disturbance. To achieve a similar attenuation to 2 cm of polypropylene co-polymer, 6 cm of polystyrene foam would be required. An enclosure for a seismic sensor using polypropylene co-polymer would be 8 cm smaller in diameter than a seismic sensor using polystyrene foam:

= 2 cm thickness × 2 (for both sides) − 6 cm thickness × 2 (for both sides)

= 8 cm

An enclosure 8 cm smaller in diameter is more economic especially since the enclosure is a pressure vessel. The mean depth of insulating material used in the insulation module 25 according to an embodiment of the present invention is about 2 cm. This depth provides significant attenuation in the passband and minimizes the volume of the seismic sensor.

In addition to the thermal properties described above, the insulating material can also have certain mechanical properties that will not degrade the sensing of seismic motion. For example, the insulating material should not introduce unwanted spurious mechanical resonances (e.g., by using a rigid material) within a decade of the sensor's passband. To reduce the risk of the axis mechanics being polluted by dust particles in the air inside the enclosure, the material chosen for use inside the enclosure can be non-dusting, or encapsulated in a non-dusting material.

Figure 8:
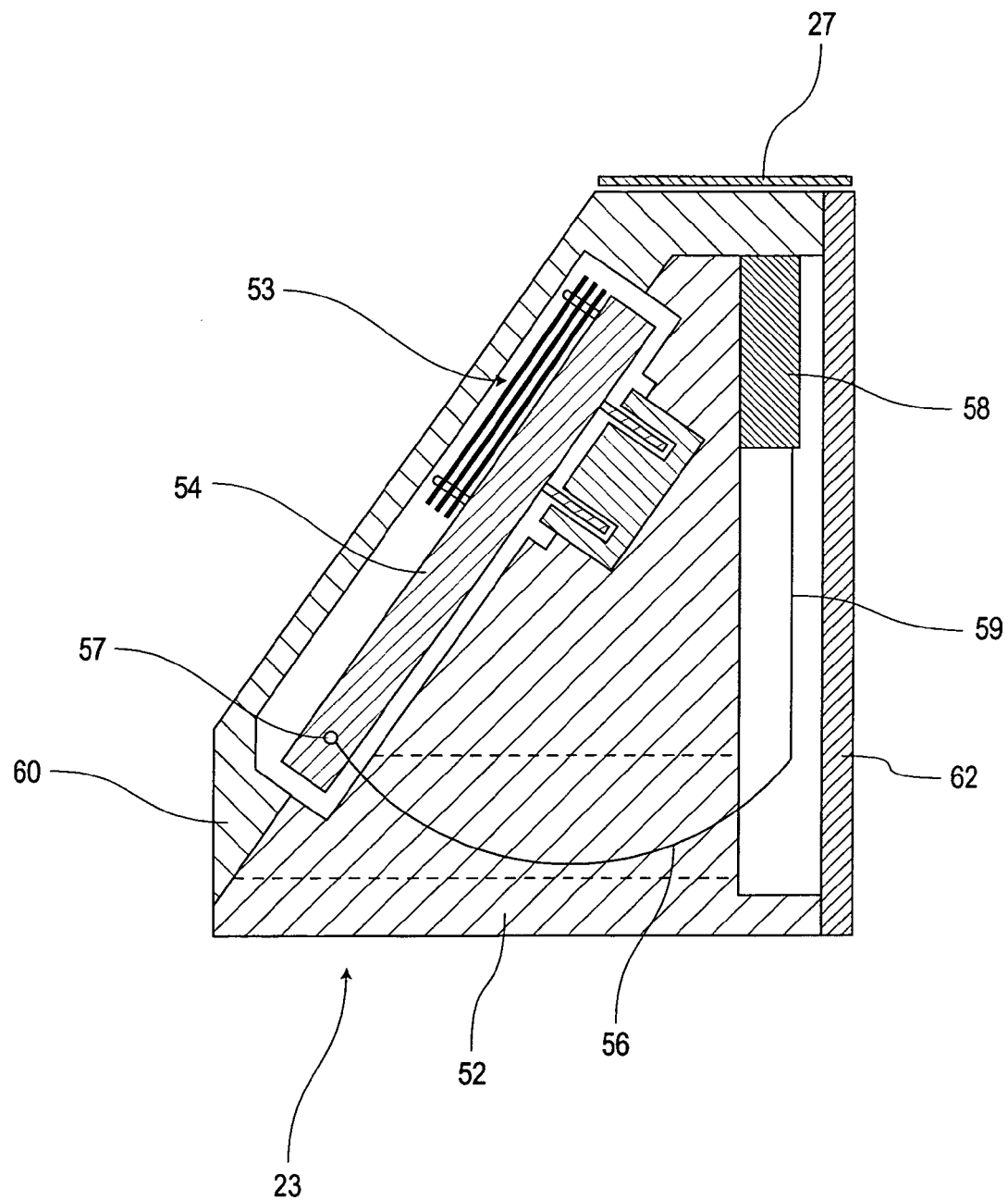
FIG. 8 illustrates a schematic side view of the axis mechanics of a seismic sensor.

FIG. 8 illustrates a side view of the typical components of an axis mechanics module 50, a schematic of an embodiment of 23. The module 50 includes a frame 52 for supporting a boom 54 at the suspension point 57 having an axis spring 56 connected at a lower end. The frame has axis electronics 27 attached to the top. The other end of the axis spring 56 is connected via a wire 59 to a mass position mechanism 58. Moving parts of the module 50 are enclosed by the baseplate 29, frame 52 and covers 60 and 62. The covers 60 and 62 and frame 52 isolate moving parts in the module 50 from temperature changes and convection currents.

The covers 60 and 62 and frame 52 are made of the metal which has the desirable properties of high conductivity and high heat capacity. This spreads any heat flow evenly throughout the covers and frame ensuring that the entire module 50 changes temperature at about the same rate. This minimizes mechanical distortion (and therefore an error signal in the measured data) due to different parts of the axis heating (or cooling) at different rates. The air convection currents are also minimized inside the axis because there is a minimal temperature difference across the module 50. The module 50 is effectively isothermal within the passband. Convection currents within the pressure sealed enclosure are also prevented from disturbing the moving parts of the module 50 by the covers 60 and 62 and the frame 52. The covers and frame also contribute to the overall thermal mass of the axis mechanics which increases the amount of heat required to change the temperature of the axis mechanics. The axis spring is coated with a reflective material to minimize the radiant heat absorbed by the spring from the frame and the covers. In an embodiment of the present invention, the axis spring is coated in gold flash.

Figure 9:
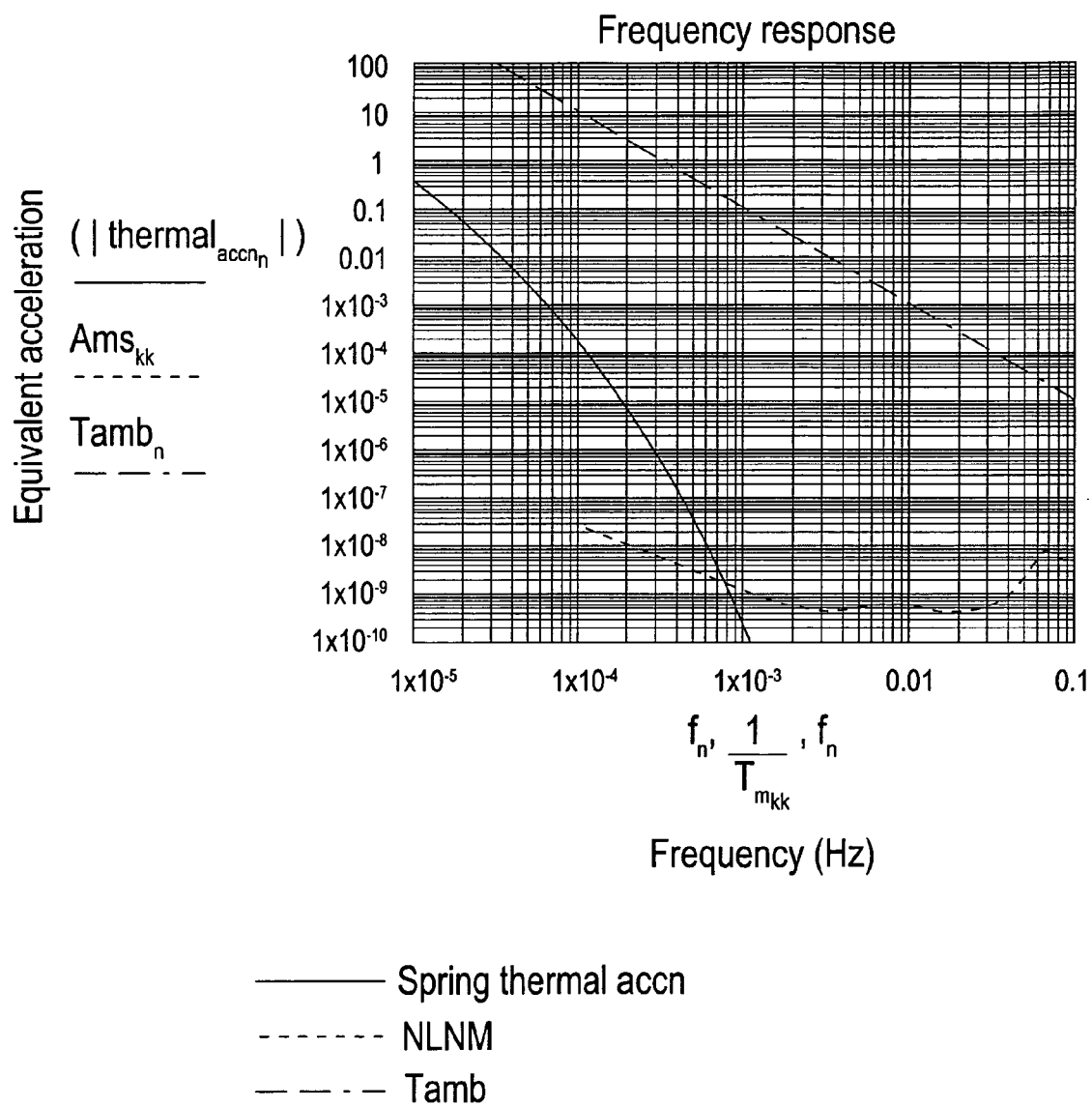
FIG. 9 illustrates a graph of theoretical performance of an exemplary embodiment of the present invention.

FIG. 9 illustrates a graph of the theoretical performance of a seismic sensor 20 that incorporates multiple thermal stabilization assemblies according to embodiments of the present invention. The graph is a plot of the spectrum of equivalent acceleration versus frequency with the new low noise model (NLNM) plotted as a reference. The ambient temperature (labeled $T_{amb}$) is plotted on the graph. The ambient temperature represents the spectral temperature profile of a typical underground concrete vault. The temperature spectrum is converted to equivalent ground acceleration using a transfer function that includes as parameters the axis spring temperature coefficient and the mass of the boom. The last curve on the graph (Spring thermal accn) presents the acceleration equivalent thermal noise seen by the axis spring after being filtered by a thermal stabilization assembly. This graph shows the attenuation of temperature fluctuations external to the seismic sensor. Note that the filtered temperature acceleration spectrum drops steeply with increasing frequency. Using concentric thermal filters and a low diffusivity material as the insulating material helps to contribute to this characteristic. The filtered temperature acceleration spectrum crosses the new low noise model at about 1200 seconds which is outside the passband of the assembly.

The table below shows the theoretical performance of different insulating materials and topologies of a typical seismic sensor:

| Material and Topology | Attenuation At 1000 s | NLNM Crossing point |
|---|---|---|
| Air - Polypropylene Co-polymer - Air | −63 db | 800 secs |
| Polystyrene foam | −52 db | 450 secs |
| Conventional Seismometer with Air | −8 db | 100 secs |

A conventional topology using air has a thermal attenuation of about 8 db which is poor. This is due to the convection of the air, and the radiant heat flow through the air. An attenuation of 52 dB is achieved by using a good insulating material such as polystyrene foam instead of air. The thermal attenuation is further improved to 63 dB by using an insulating material with a low thermal diffusivity and having small air gaps on either side of the insulating material to thermally isolate the insulating material. Air is an effective insulator (thermal conductivity of 0.025 W/mK) if it does not convect. If the air is constrained to a narrow air gap, convection is minimized and conduction is the dominant method of heat transfer. An embodiment of the present invention uses an air-low diffusivity material-air topology. However, other embodiments of the present invention implement an air-insulation material-air topology if less attenuation or a more lightweight instrument is required.

Exemplary embodiments of the present invention provide:

(a) a systematic arrangement of cascaded thermal filters to attenuate temperature effects inside the sensor enclosure. The thermally protected assembly is of a much smaller size, typically in volume of one cubic decimeter instead of one cubic meter for external insulation representing a thousand fold reduction in the volume of the protected instrument.

(b) a recognition that microscopic temperature variations of the axis mechanics caused by internal heat generated by the electronics and caused by external ambient temperature variations can be reduced to imperceptible levels by implementing the sensor as a system of concentric thermally conductive masses as isothermal shells, which are thermally isolated from each other using thermally insulating volume shells and where the most sensitive mechanics are placed in the inner most thermal mass shell. This arrangement can be considered a multi-stage thermal low pass filter. The filter parameters are designed such that the corner frequencies of the filter are well below the passband of the sensor so the filter significantly attenuates temperature variations that occur in outer layers or outside the sensor.

(c) a recognition of a concentric system of thermal masses and thermal insulators as shells (d) to place the axis mechanics in a gas (often air) filled cavity in the inner-most shell and to prevent gas flow from this cavity. Furthermore, the shells are basically continuous and of high thermal conductivity so that the axis mechanics operates in an essentially isothermal environment, which being isothermal has no convection of the gas. Convection of gas near critical mechanics perturbs the mechanics and causes intolerable noise.

(e) provisions for covers having thermal mass, which both isolate the internal gas and help force an isothermal environment for the mechanics.

(f) provisions to provide thermal isolation between the shells of thermal mass and reduce thermal conduction, thermal radiation and thermal convection. Where mechanical connection is required between shells, spacers of material having low thermal conductivity will be chosen (such as less than 6.5 W/m/K). Where mechanical connection is not required, material will be selected having high thermal resistance or low thermal diffusivity properties. Thermal convection is avoided by filling cavities with insulating material which inhibits convection and conduction, and radiation.

(g) a seismic sensor with thermal stabilization that is of a much smaller size compared to using external insulation. The thermal stabilization assembly has an approximate volume of one cubic decimeter. External insulation has a volume of one cubic meter. The thermal stabilization assembly has a thousand fold reduction in the volume over using external insulation. It allows the inclusion of a thermal stabilization assembly to improve the performance of the seismic sensor while maintaining a size that is comparable to existing portable broadband seismometers.

In summary, exemplary embodiments of the present invention provide various mechanisms to reduce the temperature sensitivity of a seismic sensor by maximizing the thermal inertia of the seismic sensor.

Although the various aspects of the present invention have been described in terms of particular embodiments and applications one of ordinary skill in the art, in light of this teaching, can generate additional embodiments and modifications without departing from the spirit of or exceeding the scope of the claimed invention. Accordingly, it is to be understood that the drawings and descriptions herein are proper by way of example to facilitate comprehension of the invention and should not be construed to limit the scope thereof.

The invention claimed is:

1. A seismometer comprising:
a pressure sealed enclosure;
an electrical component;
an axis mechanics assembly having moving components, the axis mechanics assembly being in electrical communication with the electrical component; and
a thermally insulating assembly mechanically supporting and surrounding the axis mechanics assembly for minimizing heat flow from the pressure sealed enclosure to the axis mechanics assembly and for enabling transmission of a seismic signal to the axis mechanics assembly, wherein the pressure sealed enclosure encloses the axis mechanics assembly, the thermally insulating assembly, and the electrical component.

2. The seismometer of claim 1, wherein the thermally insulating assembly includes a rigid insulating material arranged between the axis mechanics assembly and the pressure sealed enclosure to support the axis mechanics assembly.

3. The seismometer of claim 2, wherein the rigid insulating material is selected from the group consisting of ceramic, glass-epoxy, and glass filled plastic.

4. The seismometer of claim 2, further comprising a plurality of thermally insulating bolts for attaching the axis mechanics assembly to the pressure sealed enclosure.

5. The seismometer of claim 2, wherein the rigid insulating material is arranged as a plurality of spacer members supporting the axis mechanics assembly.

6. The seismometer of claim 5, wherein the axis mechanics assembly includes a metal baseplate supporting the axis mechanics assembly and wherein the plurality of spacer members support the metal baseplate.

7. The seismometer of claim 2, wherein the rigid insulating material has a thermal conductivity less than 6.5 W/m/K.

8. The seismometer of claim 2, wherein the thermally insulating assembly includes an insulating material arranged between the pressure sealed enclosure and the axis mechanics assembly.

9. The seismometer of claim 8, wherein the insulating material has a thermal diffusivity of less than $1.5 \times 10^{-7}$ m$^2$/sec.

10. The seismometer of claim 8, wherein the insulating material has a thermal conductivity less than 0.25 W/m/K.

11. The seismometer of claim 8, wherein the insulating material includes a material selected from the group consisting of: ethyl vinyl acetate, poly vinyl butyral, butyl rubber, molded urea-formaldehyde, poly vinylidene fluoride, poly vinylidene chloride, modified polystyrene, polypropylene copolymer, polyvinyl chloride, allyl resins, polypropylene and polyethylene.

12. The seismometer of claim 8, wherein the insulating material is a solid and includes a plurality of mounting regions for mounting to the axis mechanics assembly and being contactless with respect to the pressure sealed enclosure.

13. The seismometer of claim 8, wherein the insulating material is a solid and has a plurality of mounting regions for mounting to the pressure sealed enclosure and being contactless with respect to the axis mechanics assembly.

14. The seismometer of claim 13, wherein at least one of the plurality of mounting regions include flexure joint.

15. The seismometer of claim 13, wherein the plurality of mounting regions include four mounting points with the first mounting point arranged at a center of the insulating material and the second, third and fourth mounting points arranged proximate to an outer radius of the insulating material and each of the second, third and fourth mounting points being spaced by approximately 120 degrees.

16. The seismometer of claim 14, wherein the flexure joint is integral with the insulating material.

17. The seismometer of claim 1, wherein the axis mechanics assembly includes:
an axis frame having (i) a plurality of interconnecting cavities for receiving the moving components of the axis mechanics assembly and (ii) a plurality of covers attachable to the axis frame for forming a continuous cover over the moving components of the axis mechanics assembly for minimizing the movement of air about the moving components of the axis mechanics assembly and for minimizing heat flow to the moving components of the axis mechanics assembly.

18. The seismometer of claim 17, wherein the axis frame, and the plurality of covers are made of a high thermal conductivity metal and the axis frame and the plurality of covers are arranged to be in thermal contact.

19. The seismometer of claim 17, wherein the axis frame and the plurality of covers include material selected from the group consisting of aluminum, steel and brass, and alloys of aluminum, steel and brass.

20. The seismometer of claim 1, further comprising:
a member dividing the interior of the pressure sealed enclosure into a first chamber for retaining the axis mechanics assembly and a second chamber for retaining the electrical component, the member being attached to the inner perimeter of the pressure sealed enclosure for minimizing movement of air by convection between the first chamber and the second chamber and for maximizing flow of heat from the second chamber to the pressure sealed enclosure.

21. The seismometer of claim 20, wherein the member and the pressure sealed enclosure are made of the same material.

22. The seismometer of claim 20, wherein the member is mounted horizontally in the pressure sealed enclosure.

23. The seismometer of claim 1, wherein the thermally insulating assembly is arranged in the pressure sealed enclosure to thermally isolate the axis mechanics assembly from the electronic component.

24. The seismometer of claim 1, wherein the thermal insulating assembly and the axis mechanics assembly include a plurality of surfaces, each of the plurality of surfaces having an emissivity less than 0.1 for minimizing radiation based heat flow to the axis mechanics assembly.

25. The seismometer of claim 24, wherein each one of the plurality of surfaces are polished for minimizing emissivity.

26. The seismometer of claim 24, wherein each of the plurality of surfaces are coated with a low emissivity material.

27. The seismometer of claim 26, wherein the low emissivity material is selected from the group consisting of gold, nickel, aluminum, germanium, rhodium, and silver.

28. The seismometer of claim 24, wherein the axis mechanics assembly includes a spring coated with a low emissivity material.

* * * * *

(12) EX PARTE REEXAMINATION CERTIFICATE (9307th)
United States Patent
Hayman et al.

(10) Number: US 7,376,049 C1
(45) Certificate Issued: Sep. 18, 2012

(54) SEISMIC SENSOR WITH THERMAL STABILIZATION

(75) Inventors: Mark Jonathan Brice Hayman, Dunrobin (CA); Robin Brice Hayman, Dunrobin (CA); Geoffrey Stewart Bainbridge, Ottawa (CA)

(73) Assignee: Nanometrics Inc., Kanata, Ontario (CA)

Reexamination Request:
No. 90/011,575, Mar. 16, 2011

Reexamination Certificate for:
Patent No.: 7,376,049
Issued: May 20, 2008
Appl. No.: 11/337,834
Filed: Jan. 23, 2006

(30) Foreign Application Priority Data

Jan. 24, 2005 (CA) ............................................. 2493830

(51) Int. Cl.
*G01V 1/16* (2006.01)

(52) U.S. Cl. ........................................ 367/178; 367/188

(58) Field of Classification Search .................... None
See application file for complete search history.

(56) References Cited

To view the complete listing of prior art documents cited during the proceeding for Reexamination Control Number 90/011,575, please refer to the USPTO's public Patent Application Information Retrieval (PAIR) system under the Display References tab.

*Primary Examiner* — Robert M. Fetsuga

(57) ABSTRACT

A seismometer comprising a pressure sealed enclosure; an electrical component; an axis mechanics assembly having moving components, the axis mechanics assembly being in electrical communication with the electrical component; and a thermally insulating assembly mechanically supporting and surrounding the axis mechanics assembly for minimizing heat flow from the pressure sealed enclosure to the axis mechanics assembly and for enabling transmission of a seismic signal to the axis mechanics assembly, wherein the pressure sealed enclosure encloses the axis mechanics assembly, the thermally insulating assembly, and the electrical component.

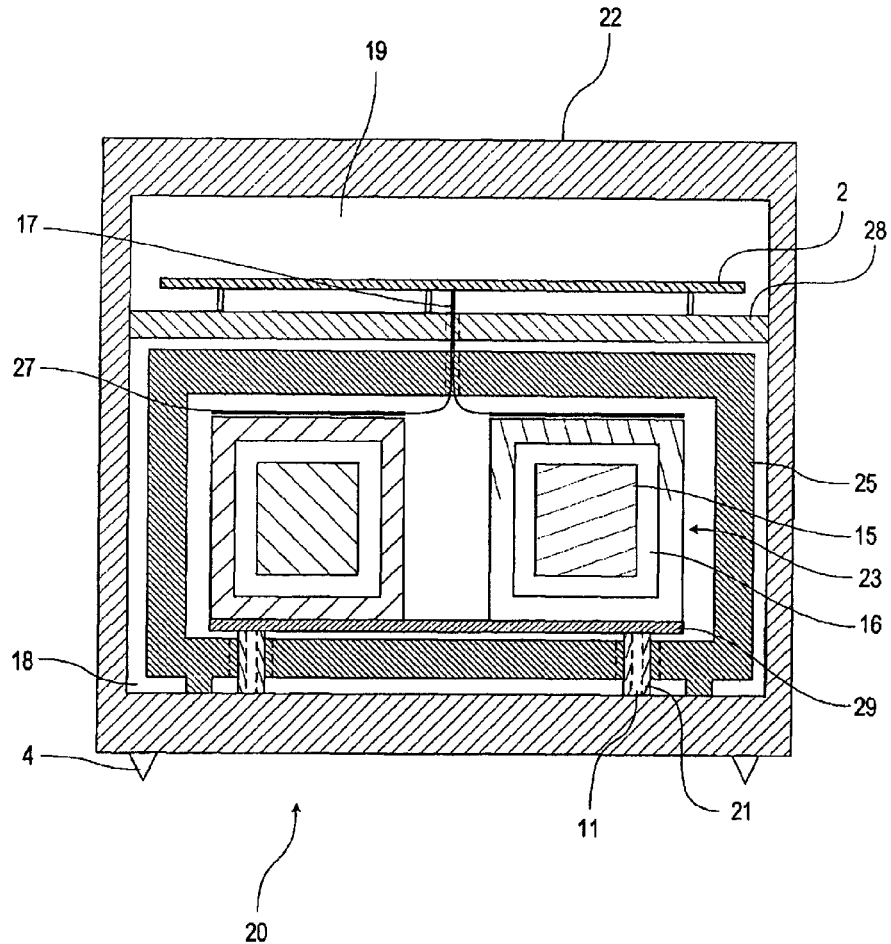

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 4-6, 8, 12-17, 20, 23, 24 and 28 are determined to be patentable as amended.

Claims 3, 7, 9-11, 18, 19, 21, 22 and 25-27, dependent on an amended claim, are determined to be patentable.

1. A seismometer comprising:
a pressure sealed enclosure;
[an electrical] *a main electronics* component *that produces heat as a byproduct of its operation, the heat byproduct of the main electronics component being the most significant heat source within the pressure sealed enclosure*;
[an] *a seismometer* axis mechanics assembly having moving components *and a transducer, the transducer being configured to produce a negligible amount of heat compared to the main electronics component*, the *seismometer* axis mechanics assembly being in electrical communication with the [electrical] *main electronics* component; and
a thermally insulating assembly mechanically supporting and surrounding the *seismometer* axis mechanics assembly[for], *but the main electronics component is not surrounded by the thermally insulating assembly, said thermally insulating assembly* minimizing heat flow from the pressure sealed enclosure to the *seismometer* axis mechanics assembly and [for] enabling transmission of a seismic signal to the *seismometer* axis mechanics assembly, wherein the pressure sealed enclosure encloses the *seismometer* axis mechanics assembly, the thermally insulating assembly, and the [electrical] *main electronics* component.

2. The seismometer of claim 1, wherein the thermally insulating assembly includes a rigid insulating material arranged between the axis *seismometer* mechanics assembly and the pressure sealed enclosure to support the *seismometer* axis mechanics assembly.

4. The seismometer of claim 2, further comprising a plurality of thermally insulating bolts for attaching the *seismometer* axis mechanics assembly to the pressure sealed enclosure.

5. The seismometer of claim 2, wherein the rigid insulating material is arranged as a plurality of spacer members supporting the *seismometer* axis mechanics assembly.

6. The seismometer of claim 5, wherein the *seismometer* axis mechanics assembly includes a metal baseplate supporting the *seismometer* axis mechanics assembly and wherein the plurality of spacer members support the metal baseplate.

8. The seismometer of claim 2, wherein the thermally insulating assembly includes an insulating material arranged between the pressure sealed enclosure and the *seismometer* axis mechanics assembly.

12. The seismometer of claim 8, wherein the insulating material is a solid and includes a plurality of mounting regions for mounting to the *seismometer* axis mechanics assembly and being contactless with respect to the pressure sealed enclosure.

13. The seismometer of claim 8, wherein the insulating material is a solid and has a plurality of mounting regions for mounting to the pressure sealed enclosure and being contactless with respect to the *seismometer* axis mechanics assembly.

14. The seismometer of claim 13, wherein at least one of the plurality of mounting regions [include] *includes a* flexure joint.

15. [The seismometer of claim 13.] *A seismometer comprising:*
*a pressure sealed enclosure;*
*an electrical component;*
*an axis mechanics assembly having moving components, the axis mechanics assembly being in electrical communication with the electrical component;*
*a thermally insulating assembly mechanically supporting and surrounding the axis mechanics assembly for minimizing heat flow from the pressure sealed enclosure to the axis mechanics assembly and for enabling transmission of a seismic signal to the axis mechanics assembly, wherein the pressure sealed enclosure encloses the axis mechanics assembly, the thermally insulating assembly, and the electrical component;*
*wherein the thermally insulating assembly includes a rigid insulating material arranged between the axis mechanics assembly and the pressure sealed enclosure to support the axis mechanics assembly;*
*wherein the thermally insulating assembly includes an insulating material arranged between the pressure sealed enclosure and the axis mechanics assembly;*
*wherein the insulating material is a solid and has a plurality of mounting regions for mounting to the pressure sealed enclosure and being contactless with respect to the axis mechanics assembly; and*
wherein the plurality of mounting regions include four mounting points with the first mounting point arranged at a center of the insulating material and the second, third and fourth mounting points arranged proximate to an outer radius of the insulating material and each of the second, third and fourth mounting points being spaced by approximately 120 degrees.

16. [The seismometer of claim 14.] *A seismometer comprising:*
*a pressure sealed enclosure;*
*an electrical component;*
*an axis mechanics assembly having moving components, the axis mechanics assembly being in electrical communication with the electrical component;*
*a thermally insulating assembly mechanically supporting and surrounding the axis mechanics assembly for minimizing heat flow from the pressure sealed enclosure to the axis mechanics assembly and for enabling transmission of a seismic signal to the axis mechanics assembly, wherein the pressure sealed enclosure encloses the axis mechanics assembly, the thermally insulating assembly, and the electrical component;*
*wherein the thermally insulating assembly includes a rigid insulating material arranged between the axis mechanics assembly and the pressure sealed* enclosure to support the axis mechanics assembly;
wherein the thermally insulating assembly includes an insulating material arranged between the pressure sealed enclosure and the axis mechanics assembly; wherein the insulating material is a solid and has a plurality of mounting regions for mounting to the pressure sealed enclosure and being contactless with respect to the axis mechanics assembly;
wherein at least one of plurality of mounting regions includes a flexure joint; and wherein the flexure joint is integral with the insulating material.

17. The seismometer of claim 1, wherein the *seismometer* axis mechanics assembly includes:
an axis frame having (i) a plurality of interconnecting cavities for receiving the moving components of the *seismometer* axis mechanics assembly and (ii) a plurality of covers attachable to the axis frame for forming a continuous cover over the moving components of the *seismometer* axis mechanics assembly for minimizing the movement of air about the moving components of the *seismometer* axis mechanics assembly and for minimizing heat flow to the moving components of the *seismometer* axis mechanics assembly.

20. [The seismometer of claim 1, further comprising:] *A seismometer comprising:*
*a pressure sealed enclosure;*
*an electrical component;*
*an axis mechanics assembly having moving components, the axis mechanics assembly being in electrical communication with the electrical component;*
*a thermally insulating assembly mechanically supporting and surrounding the axis mechanics assembly for minimizing heat flow from the pressure sealed enclosure to the axis mechanics assembly and for enabling transmission of a seismic signal to the axis mechanics assembly, wherein the pressure sealed enclosure encloses the axis mechanics assembly, the thermally insulating assembly, and the electrical component; and*
a member dividing the interior of the pressure sealed enclosure into a first chamber for retaining the axis mechanics assembly and a second chamber for retaining the electrical component, the member being attached to the inner perimeter of the pressure sealed enclosure for minimizing movement of air by convection between the first chamber and the second chamber and for maximizing flow of heat from the second chamber to the pressure sealed enclosure.

23. The seismometer of claim 1, wherein the thermally insulating assembly is arranged in the pressure sealed enclosure to thermally isolate the *seismometer* axis mechanics assembly from the electronic component.

24. The seismometer of claim 1, wherein the thermal insulating assembly and the *seismometer* axis mechanics assembly include a plurality of surfaces, each of the plurality of surfaces having an emissivity less than 0.1 for minimizing radiation based heat flow to the *seismometer* axis mechanics assembly.

28. The seismometer of claim 24, wherein the *seismometer* axis mechanics assembly includes a spring coated with a low emissivity material.

\* \* \* \* \*